Sept. 23, 1924.

C. SIMS 1,509,379

DISPLAY DEVICE FOR MOTOR CARS

Filed Oct. 22, 1923

INVENTOR
CLARENCE SIMS
By Shigley & Harney
ATTORNEYS

Patented Sept. 23, 1924.

1,509,379

UNITED STATES PATENT OFFICE.

CLARENCE SIMS, OF LANCASTER, OHIO.

DISPLAY DEVICE FOR MOTOR CARS.

Application filed October 22, 1923. Serial No. 670,084.

*To all whom it may concern:*

Be it known that I, CLARENCE SIMS, a citizen of the United States of America, residing at Lancaster, in the county of Fairfield and State of Ohio, have invented certain new and useful Improvements in Display Devices for Motor Cars, of which the following is a specification.

My present invention relates generally to display or advertising devices and more particularly to a display or advertising device applicable to automobiles and moving vehicles of a like nature, my object being the provision of a simple, effective and economical device which may be readily and quickly mounted at various points upon an automobile and which is electrically lighted for the purpose of displaying advertisements of goods and various merchandise or for the display of the goods or merchandise itself, and a further object is the provision of an advertising display device of this nature which may if desired be mounted so as to also act as a parking lamp.

Figure 1:
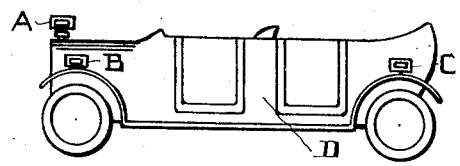
Figures 2, 3:
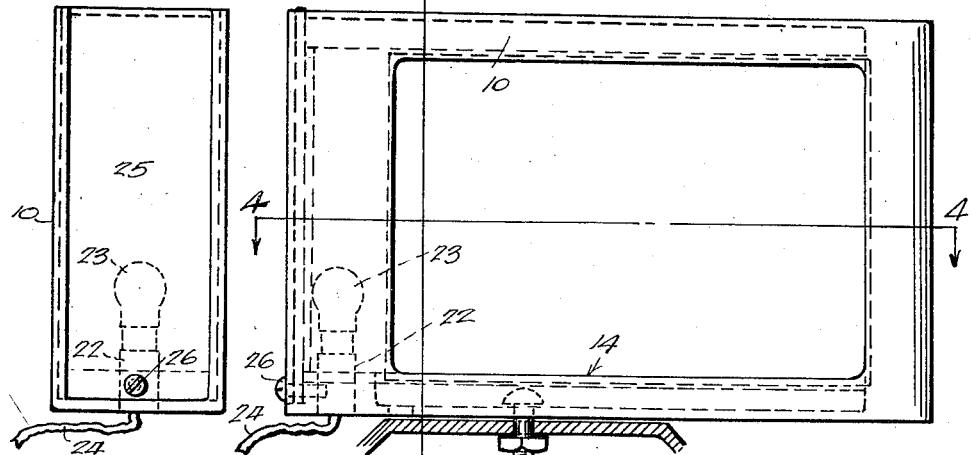
Figure 4:
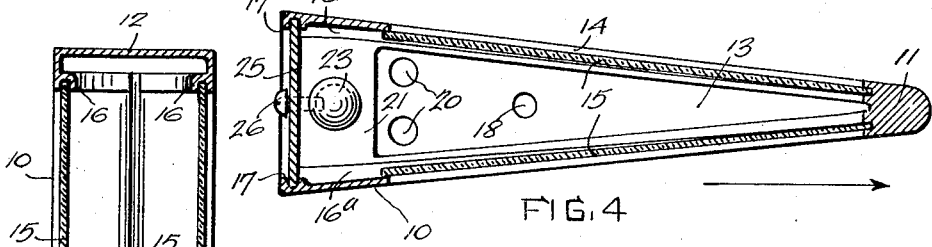
Figure 5:
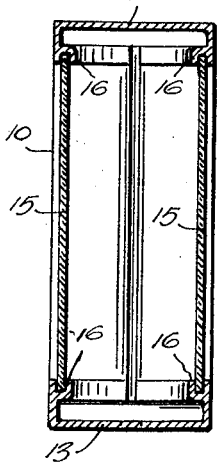
Figure 6:
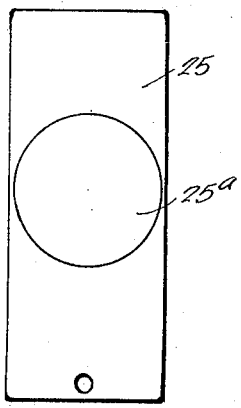

In the accompanying drawing which illustrates my present invention and forms a part of this specification, Figure 1 is a side view illustrating the practical application of my invention, Figure 2 is a side view of my invention, Figure 3 is an end view thereof, Figures 4 and 5 are respectively a horizontal and a vertical transverse section through the device, and Figure 6 is an elevation of the end closure plate or door showing a slight modification.

Referring now to these figures and particularly to Figure 1 I have shown my improved display or advertising device mounted at the several points A, B and C of an automobile generally indicated at D. In the position A the device appears in connection with a radiator cap. At B the device appears mounted on one of the front fenders and at C the device appears mounted on one of the rear fenders, it being understood that but a single device or example of the invention is utilized on a single machine, mounted in one of the three places indicated or at any other place to which it may be properly and effectively placed.

My invention proposes a display or advertising device consisting of a hollow casing of the generally triangular form most plainly to be seen by reference to Figure 4, the frame including rigid sides 10 tapering comparatively to a point 11 at one end and having a rigid top 12 and bottom 13.

The frame also has enlarged openings 14 in its side walls 10 which are intended to be covered by glass panels 15 and the like, the latter being fully transparent where it is desired to display the material or merchandise itself placed within the frame and may also be translucent where advertising is displayed thereon in either opaque or transparent lettering.

The display panels 15 covering the side openings 14 are placed within the frame within lengthwise guide channels 16 shown particularly in Figure 5 and extending along the upper and lower edges of the side openings 14, these guide channels being widened as at 16ª adjacent to the vertically grooved edges 17 of the side walls at the open end of the casing or frame so that the panels 15 of glass, celluloid or any other suitable transparent or translucent material may be easily shifted into and out of the desired and effective position shown.

At a point approximately centrally between the ends of the casing or frame, its base 13 is provided with an opening 18 for the reception of a clamping bolt 19 by means of which it may be securely fastened to the radiator cap, or front or rear fenders or other suitable point of an automobile as first described above. Rearwardly of the opening 18 for the reception of the clamping bolt the base 13 has ventilating apertures 20. The base is also provided adjacent to the open end of the casing with a thickened apertured portion 21 designed to receive a bulb holder 22 into which in practice a bulb 23 is fixed so as to light the interior of the frame or casing. The usual flexible lead 24 extends to the bulb holder 22 and it is obvious that the lighting of the casing is thus readily provided for irrespective of its location on any particular part of the automobile or motor car.

The open end of the casing is normally closed by a vertically sliding closure or door 25 whose side edges enter the vertically grooved portions 17 of the side bolts 10 and which closure or door is provided adjacent to its lower end with an opening for the reception of a clamping screw 26 threaded into an aperture in the thickened portion 21 of the base 13 with its free end adapted to extend into a socket in the bulb holder 22 as shown particularly in Figures 2 and 4 so that the clamping screw thus performs the twofold function of holding the closure or door in place and detachably clamping the bulb holder.

In practice the inner surface of the door or closure 25 will be lined with reflecting material so as to form a reflecting surface and thus reflect the direct beams of the lamp bulb 23 through the side panels 15. Furthermore this closure or door 25 may, when the device is mounted in the position C on the rear fender of an automobile, be either of transparent or translucent material in whole or in part and may for instance have a section 25ᵃ as in Figure 6 colored red so that as thus positioned the display device will also act as a parking light.

My invention thus provides a simple inexpensive device which may be effectively utilized in practice for the purposes stated, and which may be readily and easily mounted or demounted as desired.

I claim:

1. A display or advertising device of the character described including a rigid triangular casing having its inclined side walls provided with enlarged display openings and having the larger of its two ends open, guides within the casing along the said side openings, panels shiftable through the open end of the casing and into said guides to normally cover the said side openings, clamping means for supporting the casing in place depending through the base of the casing, a door normally covering the open end of the casing, a bulb holder for an electric lamp bulb extending through an opening in the base of the casing adjacent to the open end thereof, and a single clamping member extending through the said door and threaded through a portion of the base of the casing into engagement with said bulb holder to detachably connect the door and at the same time clamp the bulb holder in place.

2. A display or advertising device of the character described consisting of a generally triangular rigid frame or casing open at the larger of its two ends and having side walls provided with enlarged openings and with guide beams along the upper and lower edges of said openings and also along the vertical edges of the side walls at the open end of the casing, side panels insertable through the open end of the casing into the first mentioned grooves to normally cover the said side openings, a door slidable vertically into and out of the last mentioned grooves to normally close the open end of the casing, clamping means depending through the base of the casing, a bulb holder mounted through the base of the casing, and means to detachably clamp the said closure door and the said bulb holder in place.

In testimony whereof I have affixed my signature.

CLARENCE SIMS.